(12) United States Patent
Froemming et al.

(10) Patent No.: US 7,797,516 B2
(45) Date of Patent: Sep. 14, 2010

(54) MICROCONTROLLER WITH LOW-COST DIGITAL SIGNAL PROCESSING EXTENSIONS

(75) Inventors: Benjamin Francis Froemming, San Jose, CA (US); Emil Lambrache, Campbell, CA (US)

(73) Assignee: ATMEL Corporation, San Jose, CA (US)

( * ) Notice: Subject to any disclaimer, the term of this patent is extended or adjusted under 35 U.S.C. 154(b) by 206 days.

(21) Appl. No.: 11/687,264

(22) Filed: Mar. 16, 2007

(65) Prior Publication Data

US 2008/0229075 A1    Sep. 18, 2008

(51) Int. Cl.
G06F 9/00 (2006.01)
(52) U.S. Cl. ............... 712/221; 712/210; 712/226; 708/523
(58) Field of Classification Search ......... 712/210, 712/221, 226; 703/523
See application file for complete search history.

(56) References Cited

U.S. PATENT DOCUMENTS

| | | | | |
|---|---|---|---|---|
| 5,241,492 A | * | 8/1993 | Girardeau, Jr. | 708/523 |
| 5,422,805 A | * | 6/1995 | McIntyre et al. | 708/625 |
| 5,666,300 A | * | 9/1997 | Adelman et al. | 708/521 |
| 5,793,661 A | * | 8/1998 | Dulong et al. | 708/603 |
| 5,968,162 A | | 10/1999 | Yard | |
| 6,032,248 A | | 2/2000 | Curry et al. | |
| 6,049,858 A | | 4/2000 | Kolagotla et al. | |
| 6,182,140 B1 | * | 1/2001 | Feig et al. | 709/226 |
| 6,219,797 B1 | | 4/2001 | Liu et al. | |
| 6,317,822 B1 | | 11/2001 | Padwekar | |
| 6,434,690 B1 | * | 8/2002 | Ohsuga et al. | 712/35 |
| 6,691,219 B2 | | 2/2004 | Ma et al. | |
| 6,728,739 B1 | * | 4/2004 | Kobayashi et al. | 708/208 |
| 6,957,321 B2 | | 10/2005 | Sheaffer | |
| 7,129,862 B1 | * | 10/2006 | Shirdhonkar et al. | 341/67 |
| 2001/0023489 A1 | | 9/2001 | Liu et al. | |
| 2002/0103978 A1 | * | 8/2002 | Ma et al. | 711/154 |
| 2002/0133687 A1 | | 9/2002 | Little et al. | |
| 2002/0154769 A1 | | 10/2002 | Petersen et al. | |
| 2003/0120938 A1 | | 6/2003 | Mullor | |
| 2004/0006584 A1 | * | 1/2004 | Vandeweerd | 709/107 |
| 2005/0069138 A1 | | 3/2005 | De Jong | |
| 2006/0200650 A1 | | 9/2006 | Froemming et al. | |
| 2006/0212679 A1 | | 9/2006 | Alfano et al. | |

FOREIGN PATENT DOCUMENTS

WO    WO99/01815    1/1999

OTHER PUBLICATIONS

Johann Groszschaedl "Instruction Set Extension for Long Integer Modulo Arithmetic on RISC-Based Smart Cards" Computer Architecture and High Performance Computing, 2002. Proceedings. 14th Symposium on Oct. 28-30, 2002 pp. 13-19.*

(Continued)

*Primary Examiner*—Eddie P Chan
*Assistant Examiner*—Idriss N Alrobaye
(74) *Attorney, Agent, or Firm*—Fish & Richardson P.C.

(57) ABSTRACT

A set of low-cost microcontroller extensions facilitates Digital Signal Processing (DSP) applications by incorporating a Multiply-Accumulate (MAC) unit in a Central Processing Unit (CPU) of the microcontroller which is responsive to the extensions.

18 Claims, 11 Drawing Sheets

OTHER PUBLICATIONS

Intel, MCS 51 Microcontroller Family User's Manual, Feb. 1994, 144 pages.*

PCT International Search Report dated Jan. 10, 2008 corresponding to PCt/US2007/075646, 4 pages.

Dallas Semiconductor MAXIM Application Note 603: "Implementing a Serial Port FIFO using Dual Data Pointers", Mar. 15, 2002.

Gergen, et al., Freestyle Semiconductor application note: "Novel Digital Signal Processing Architecture with Microcontroller Features", 2005.

Intel Corporation: "Architectural Description of Embedded Signal Processors and DSP Algorithm Implementation".

International Search Report in corresponding PCT application No. PCT/US2008/057145 dated Aug. 18, 2008, 2 pages.

Dallas Semiconductor Maxim Application Note 605: "Data Pointer Decrement Feature Simplifies Copy Operation for Overlapping Memory Buffers", Apr. 3, 2002.

Dallas Semiconductor Maxim Application Note 2035: "The Fast 8051 Microcontroller: Leading the Way in Growth and Innovation", May 14, 2003.

Dallas Semiconductor Maxim Application Note 603: "Implementing a Serial Port FIFO using Dual Data Pointers", Mar. 15, 2002.

Intel, "MCS® MicroController Family User's Manual," Feb. 1994, 144 pages.

Advisory Action in U.S. Appl. No. 11/687,474, mailed Mar. 17, 2010, 4 pages.

* cited by examiner

MICROCONTROLLER WITH LOW-COST DIGITAL SIGNAL PROCESSING EXTENSIONS

RELATED APPLICATIONS

The subject matter of this patent application is related to co-pending and jointly-owned U.S. patent application Ser. No. 11/687,474, for "Data Pointers With Fast Context Switching," filed Mar. 15, 2007, which patent application is incorporated by reference herein in its entirety.

TECHNICAL FIELD

The disclosed implementations are generally related to integrated circuits.

BACKGROUND

Applications involving data processing (e.g., data received from sensors) may require digital filtering. In applications where high performance digital filtering is required, a dedicated Digital Signal Processor (DSP) may be used. In some low performance applications, however, a DSP can be too expensive and power-consuming to be a viable solution. An efficient alternative to the DSP is an 8-bit or 16-bit microcontroller, which can be configured to implement digital filtering operations. Some conventional microcontrollers provide the additional advantage of including Input/Output (I/O) features and communication modules that may not be included in a typical DSP.

An example of a conventional 8-bit microcontroller is the 8051 microcontroller, which uses the MCS-51 instruction set. In the past, DSP applications have typically not been implemented on the 8051 microcontroller due to its relatively poor performance in performing DSP operations. However, high-performance, single-cycle implementations of the 8051 microcontroller have now made the 8051 microcontroller a viable option for DSP applications.

DSP algorithms that implement digital filters typically rely on computing a sum of products given by $$Y = \sum_{i=0}^{N} A(i) \cdot X(i) \quad (1)$$

where Y is the sum of products result, A(i) is a coefficient value, X(i) is a sample value, i is an index value and N is the number of filter taps.

Referring to equation [1], for each iteration of the summation operator, a product is computed and added to a running sum. Such operation is often referred to as a Multiply-Accumulate (MAC) operation when implemented in hardware. Central Processing Units (CPUs) used in microcontrollers typically can implement a MAC operation entirely in software. Implementing a MAC operation in software, however, can increase overhead, especially when implementing the MAC algorithm with 16-bit precision on an 8-bit CPU. For example, implementing a single MAC iteration on a conventional 8051 microcontroller can use from 100 to 1,800 clock cycles (worst case) to compute a single product and add it to the sum. Since N+1 products are needed for one output value, the computation time for performing a MAC operation in software can become quite large.

Microcontroller with Separate Hardware MAC Unit

One solution for reducing computation time is to use a dedicated MAC coprocessor. FIG. 1 is a block diagram illustrating a conventional microcontroller 100 (e.g., 8051 based microcontroller) including a separate hardware MAC coprocessor. The microcontroller 100 includes a MAC unit 102 coupled to a CPU 104. The MAC unit 102 can include a 16×16 bit multiplier 106 and a 40-bit adder/accumulator (ADD) 108. The MAC unit 102 can also include two pairs of 8-bit registers: register pair 110 (AH 114 and AL 116) and register pair 112 (BH 118 and BL 120). The registers 110, 112, are operable to store operands for a MAC operation. The MAC unit 102 can also include accumulator registers 121 configured as a 40-bit MAC register. For example, register 121 can include five accumulators: accumulator register 122 (MAC0), register 124 (MAC1), register 126 (MAC2), register 128 (MAC3) and register 130 (MAC 4).

The CPU 104 includes register 136 (B), accumulator 134 (ACC) and 8×8 bit multiplier 138. Although the CPU 104 does not include any specific MAC hardware it can be used to perform MAC operations. The computation time required for CPU 104 to perform a MAC operation, however can be on the order of 1,080 clock cycles due to the limitations of the hardware.

The MAC unit 102 can be interfaced to CPU 104 through one or more Special Functions Registers (not shown) included in the microcontroller 100 and bus 132. Depending on the implementation of MAC unit 102, multiple SFRs (e.g., 12 or more) may be required to operate the MAC unit 102. For example, if the microcontroller 100 is a conventional 8051 microcontroller, four 8-bit registers (e.g., register pairs 110 and 112) can be used to hold the two 16-bit operands, five MAC registers (e.g., accumulators 122, 124, 126, 128, 130) can be used for the adder/accumulator (e.g., ADD 108), and a dedicated MAC status and control register (not shown) can be used to control the MAC operation and to keep track of MAC operation status. The MAC unit 102 can also include hardware and/or software to shift or clear the accumulated results of the MAC operation by setting bits in a SFR. Writing a specific value to a particular operand of a SFR when the appropriate control bits are set in other SFRs can trigger a MAC operation in the MAC unit 102.

When used as a separate coprocessor, the MAC unit 102 includes a large number of hardware resources (e.g., 16×16 bit multiplier 106) and also requires a complex interface to the CPU 104. These factors can make the conventional microcontroller 100 too costly for use in low-cost DSP applications. A better solution is to include MAC hardware into the CPU of the microcontroller and to extend the instruction set for the microcontroller to include instructions for performing DSP operations, as described in reference to FIG. 2A.

SUMMARY

A set of low-cost microcontroller extensions facilitates DSP applications by incorporating a MAC unit in a CPU of a microcontroller which is responsive to the extensions.

In some implementations, a device includes an instruction decoder configured for detecting a dedicated Multiply-Accumulate (MAC) instruction. A central processing unit (CPU) includes a hardware MAC unit, which is configured for performing a MAC operation in accordance with the MAC instruction.

In some implementations, a method of performing Multiply-Accumulate (MAC) operations in a device includes: detecting a MAC instruction; and performing a MAC operation using a hardware MAC unit included in a central processing unit (CPU) of the device in accordance with the MAC instruction.

Other implementations are disclosed that are directed to devices, systems and methods.

DETAILED DESCRIPTION

Microcontroller with MAC Unit Included in CPU

Figure 2A:
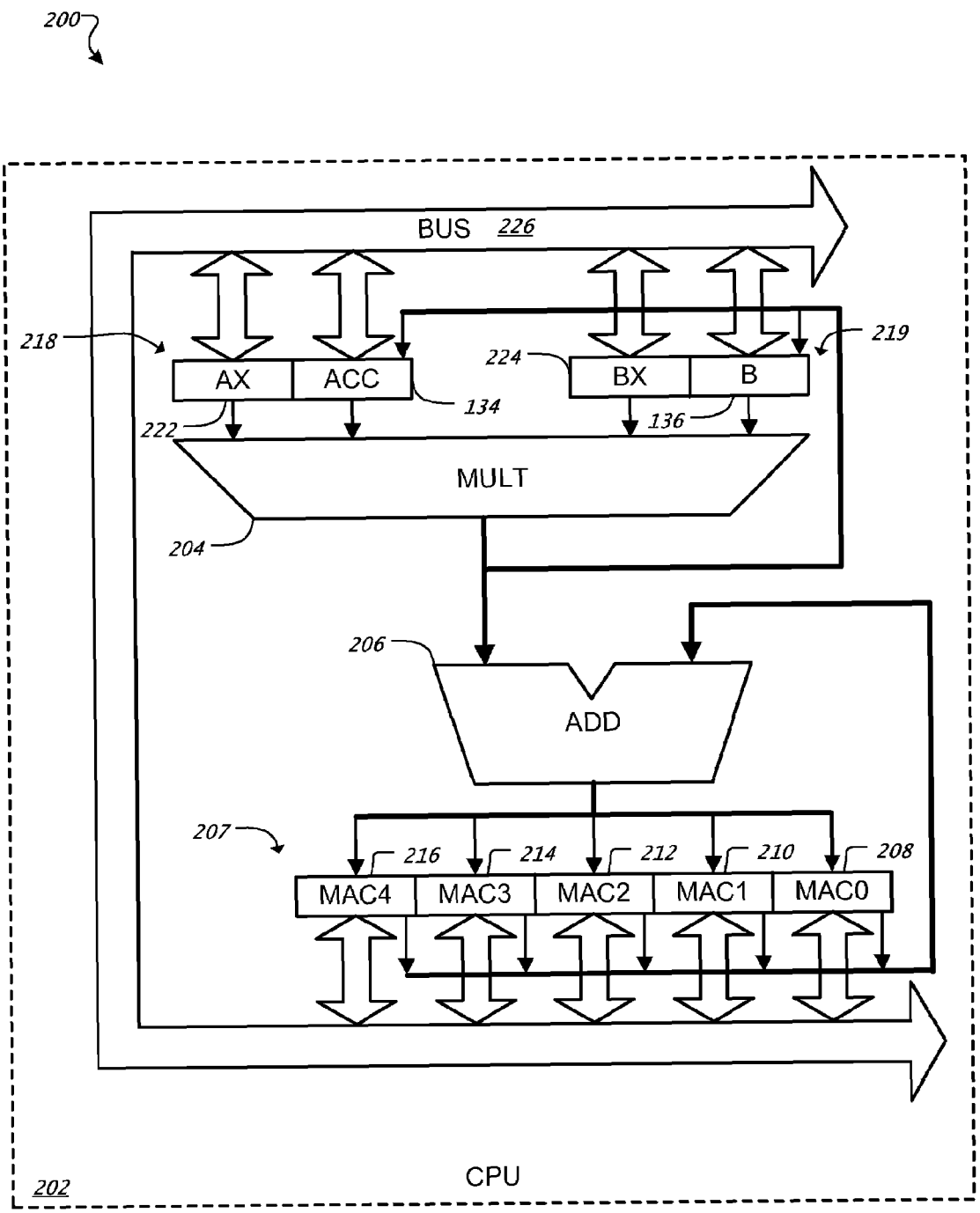
FIG. 2A is a block diagram illustrating an implementation of a hardware MAC unit included in a CPU of a microcontroller, which is responsive to an extended instruction set for DSP operations.

FIG. 2A is a block diagram illustrating an implementation of a hardware MAC unit 200 included in a CPU 202 of a microcontroller (e.g., an 8051 based microcontroller). For clarity purposes, only hardware for the CPU 202 and MAC unit 200 is shown in FIG. 2A. The microcontroller, however, can include other components, as described in reference to FIG. 9. In some implementations, the microcontroller can be a modified 8051 based controller that operates on a MCS-51 instruction set. The MAC unit 200, however, could also be included in other CPU and/or microcontroller architectures.

In some implementations, the MAC unit 200 includes a multiplier 204 (e.g., 8×8 bit multiplier) and an adder 206 (ADD) (e.g., 40-bit adder). The output of adder 206 is coupled to register 207. In the example shown, register 207 includes five accumulators: accumulator 208 (MAC0), accumulator 210 (MAC1), accumulator 212 (MAC2), accumulator 214 (MAC3) and accumulator 216 (MAC 4). Alternate implementations of the MAC unit 200 can include more than or less than five accumulators. The MAC unit 200 also includes registers 218 and 219 for storing 16-bit operands to be operated on by the multiplier 204.

Figure 1:
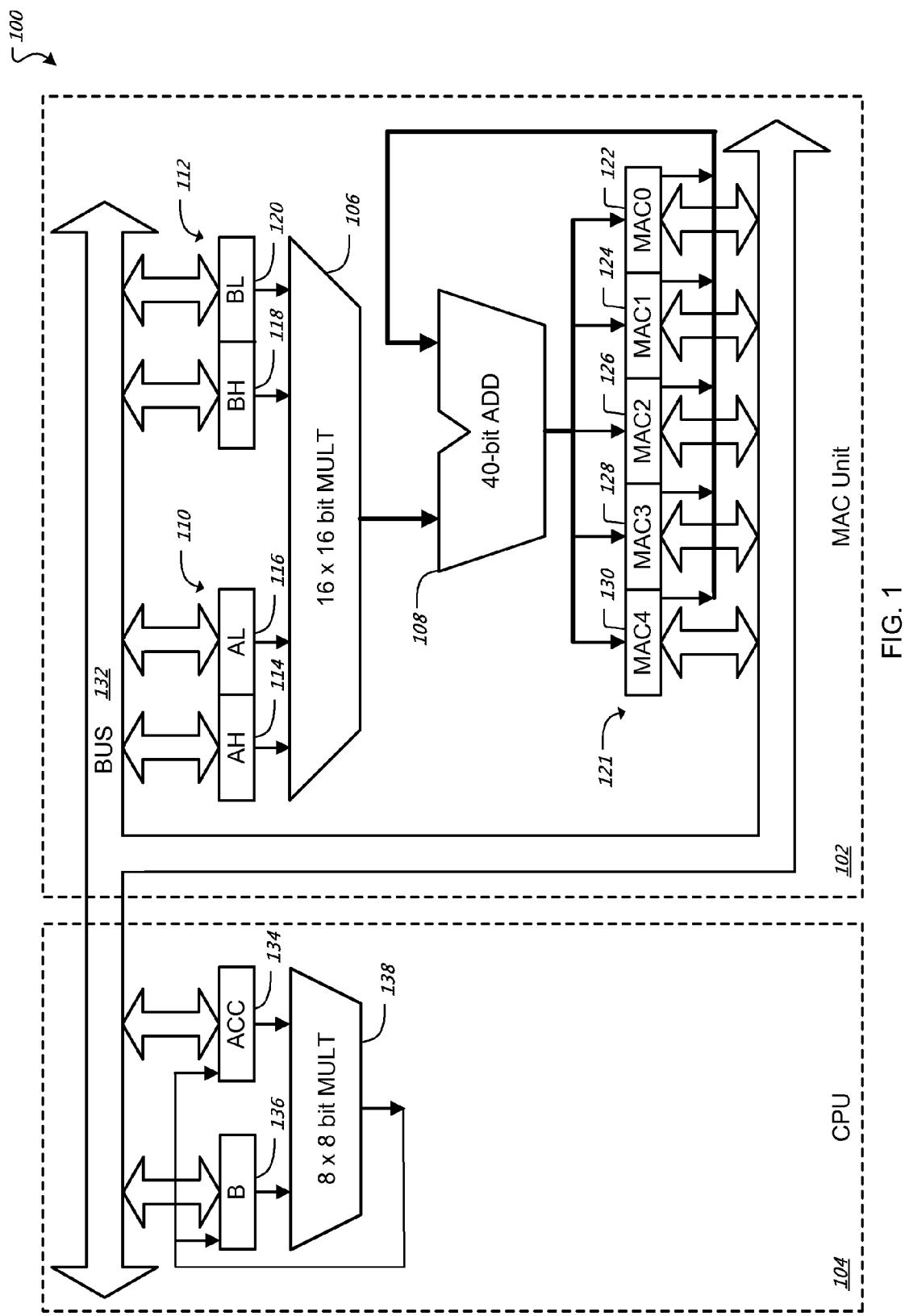
FIG. 1 is a block diagram illustrating a conventional microcontroller design including a separate hardware MAC coprocessor.

In some implementations, the MAC unit 200 can be included in the CPU 104 of the 8051 based microcontroller 100, and reuse existing hardware resources in the CPU 104 to perform MAC operations. These resources include the registers 134, 136, and the 8×8 bit multiplier 138 shown in FIG. 1. Other resources may be reused as well, such as, for example, condition flags in a program status word register (PSW). Each of these hardware resources currently exist in the CPU 104 of a conventional 8051 based microcontroller 100, and thus can be leveraged by the MAC unit 200 to perform MAC operations for DSP applications in addition to other operations (e.g., non-DSP operations).

For example, instead of adding two pairs of 8-bit registers (e.g., registers 110 and 112 in MAC unit 102) to store two 16-bit operands for the 8×8 bit multiplier 204 (e.g., 8×8 bit multiplier 138), the accumulator 218 can be made by extending accumulator register 134 with register 222 (AX) to hold a first 16-bit operand. Similarly, register 219 (B) can be made by extending register 136 with register 224 (BX) to hold a second 16-bit operand. This can result in the MAC unit 200 utilizing two less registers than the separate MAC unit 102 shown in FIG. 1. As noted above, the multiplier 204 can be implemented by reusing the 8×8 multiplier 138 in the CPU 104 of microcontroller 100.

In some implementations, the MAC unit 200 includes a bus 226 for allowing the registers 218, 219, to communicate with other registers or devices included in the CPU 202. The bus 226 can also allow register 207 to communicate with other registers or devices included in the CPU 202. In some implementations, the MAC unit 200 can set flags directly in a PSW register (not shown). In some implementations, the MAC unit 200 can include a dedicated MAC status register, thus saving one additional register over the MAC unit 102 of FIG. 1. In some implementations, the MAC unit 200 allows bit manipulation of MAC overflow or sign flags used in a MAC operation.

In some implementations, the MAC unit 200 can use the 8×8 bit multiplier 204 to perform 16×16 bit multiply operations. This can result in further cost reductions over the conventional MAC unit 102. For example, the 8×8 bit multiplier 204 can be four times smaller than the 16×16 bit multiplier 106 by being modified to accommodate signed arithmetic. The 8×8 bit multiplier 204 can generate four partial products (ACC●B, ACC●BX, AX●B, and AX●BX) that are successively added to the adder 206. The use of partial products can result in a MAC operation that takes more time (e.g., 9 clock cycles) than if a full 16×16 multiplier is used (e.g., using MAC unit 102—2 clock cycles), but less time than if the CPU 202 contained no MAC operation support hardware.

Thus, significant cost savings can be achieved by using existing components in the CPU of a conventional 8051 based microcontroller rather than dedicated components in a separate coprocessor with the trade-off being a decrease in processing speed. Alternate implementations of the MAC unit 200 can be developed that may trade off performance for cost. For example, the 8×8 bit multiplier can be replaced with a 16×16 multiplier to improve performance (e.g., speed), but the addition of such hardware may add cost to the manufacture of the microcontroller.

In some implementations, an extended instruction (MAC AB) can be included in the microcontroller instruction set to operate the MAC unit 200. For example, the MAC AB instruction can be implemented as an extended instruction in an MCS-51 based instruction set for an 8051 microcontroller by appending (e.g., prefixing) the MUL instruction (or other arithmetic instruction) with an escape code (e.g., A5h).

In some implementations, the MAC unit 200 can also include three additional extended instructions: ASR M, LSL M, and CLR M. These instructions arithmetically shift right, logically shift left and clear, respectively, the 40-bit register 207. These instructions can also be implemented as extended instructions in an MCS-51 based instruction set for an 8051 based microcontroller. For example, a conventional 8051 based microcontroller supports these operations through the use of control bits in a SFR. However, since SFRs associated with the MAC operation may not be bit-addressable the minimum time to set a bit in a SFR can be up to three clock cycles. The extended instructions of the MAC unit 200 in the 8051 based microcontroller require only two clock cycles. The extended instructions can also be implemented on an 8051 based microcontroller by appending (e.g., prefixing) the original MCS-51 based instruction with an escape code (e.g., A5h).

Table I below lists an exemplary extended instruction set that can be implemented in an MCS-51 base instruction set on an 8051 microcontroller for MAC operations.

TABLE I

DSP Extensions

| DSP instructions | OP Code | Cycles |
| --- | --- | --- |
| MAC AB | A5 A4h | 9 |
| ASR M | A5 03h | 2 |
| LSL M | A5 23h | 2 |
| CLR M | A5 E4h | 2 |

In some implementations, the use of extended instructions in Table I can also convey the intent of the programmer within the software code. For example, another programmer tasked with debugging or re-using the software code can quickly understand the algorithm without delving into the values of specific control bits and register addresses.

Sliding Window Format to Access Accumulators

Figure 2B:
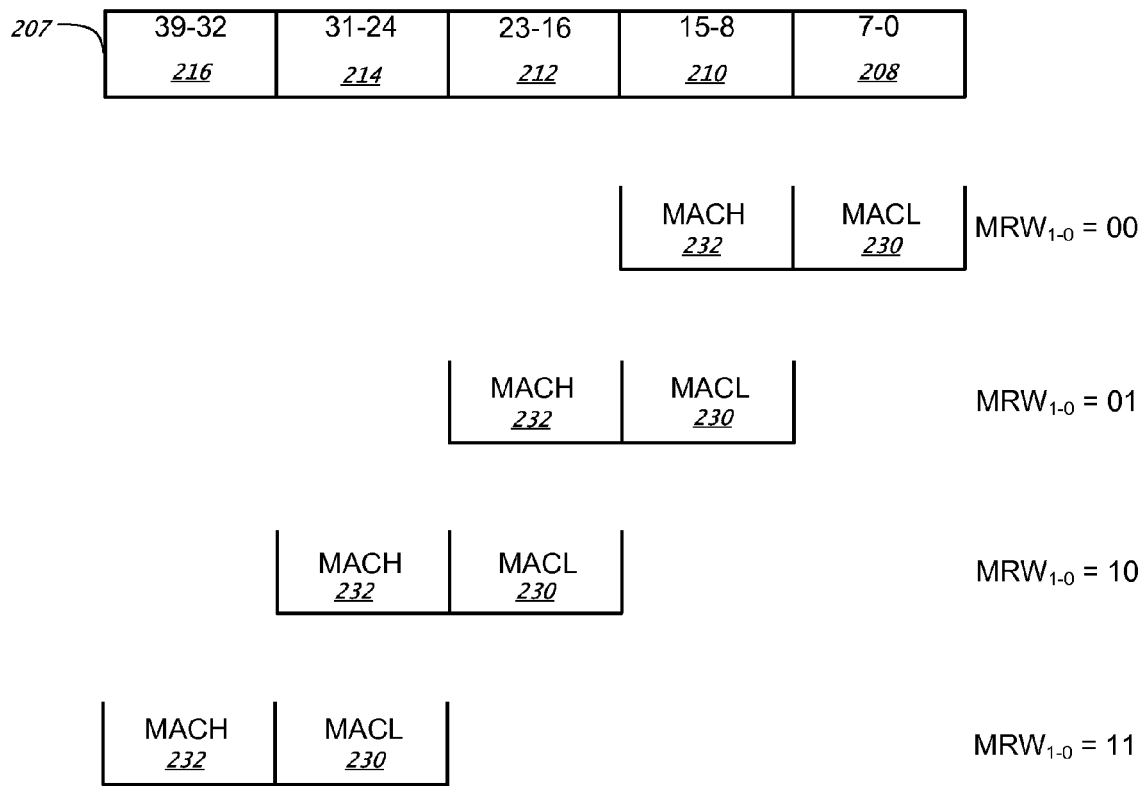
FIG. 2B illustrates an implementation of a sliding window format used to access registers used in the MAC unit of FIG. 2A.

FIG. 2B illustrates an implementation of a sliding window format used to access register 207 used in the MAC unit 200 of FIG. 2A. As shown in FIG. 2A, the register 207 store the results of a MAC operation and includes five accumulators: accumulator 208 (MAC0), accumulator 210 (MAC1), accumulator 212 (MAC2), accumulator 214 (MAC3), and accumulator 216 (MAC 4). This format reduces the number of special function register addresses required to access the MAC results from 5 to 2. The benefit is that reducing the number of register addresses required allows the limited number of remaining addresses to be allocated for other functions.

In some implementations, the register 207 can be accessed in a sliding window format. A SFR location 230 (MACL (0xE4)) determines where a lower byte of data will be placed in register 207 and a SFR location 232 (MACH (0xE5)) determines where an upper byte of data will be placed in register 207. The two bytes of register 207 that can be accessed through SFR locations 230, 232, can be determined by the settings of window bits ($MRW_{1-0}$) of a DSP configuration register (DSPR), which will be described in reference to FIG. 3.

For example, in a MAC operation a data sample can be located in a 16-bit operand implemented as an extended accumulator, as was described in reference to FIG. 2A. Accumulator 218 can hold the lower byte of a data sample and register 222 (AX) can hold the upper byte of the data sample. When $MRW_{1-0}$=00, register location 230 can access register 208 (bytes 0-7 of register 207), and register location 232 can access register 210 (bytes 15-8 of register 207). When $MRW_{1-0}$=01, register location 230 can access register 210 (bytes 15-8 of register 207), and register location 232 can access register 212 (bytes 23-16 of register 207). When $MRW_{1-0}$=10, register location 230 can access register 212 (bytes 23-16 of register 207), and register location 232 can access register 214 (bytes 31-24 of register 207). When $MRW_{1-0}$=11, register location 230 can access register 214 (bytes 31-24 of register 207), and register location 232 can access register 214 (bytes 39-32 of register 207).

FIFO Address Portion of a CPU

Figure 3:
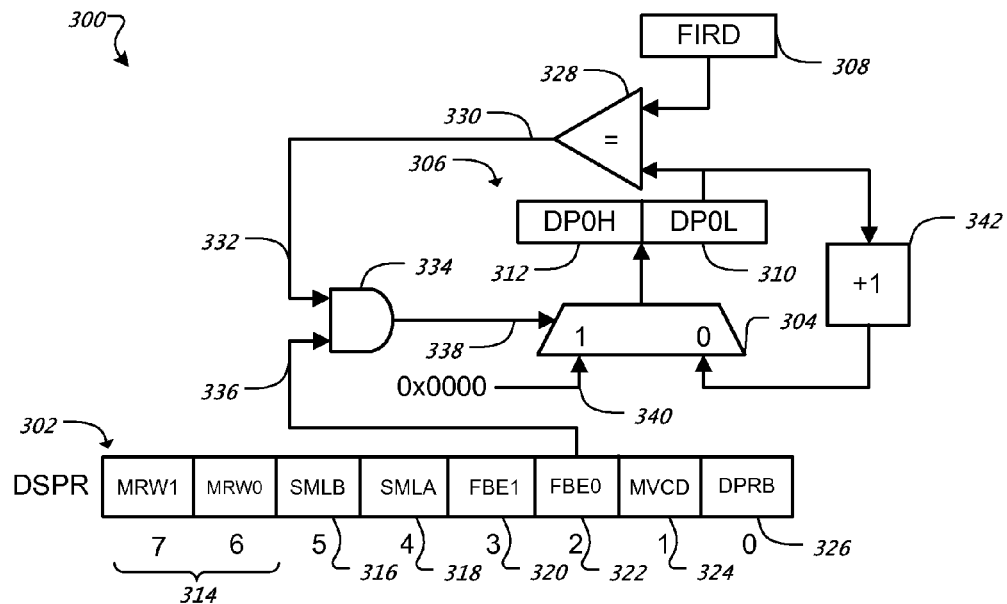
FIG. 3 illustrates an implementation of a configuration for a first-in-first-out (FIFO) address portion of a CPU for use with an extended instruction set for DSP operations.

FIG. 3 illustrates an implementation of a configuration 300 for a first-in-first-out (FIFO) address portion of a CPU (e.g., CPU 202) for use with an extended instruction set for DSP operations. The configuration 300 can include DSP configuration register 302 (DSPR), switch 304 (e.g., n:1 digital multiplexer), data pointer register 306 (DPTR0), and finite impulse response depth (FIRD) register 308. The data pointer register 306 includes low byte 310 (DPTR0L) and high byte 312 (DPTR0H).

In some implementations, a FIFO buffer can refer to a data structure where the first item added to the structure is the first item removed. An implementation of a FIFO buffer in a microcontroller can include the use of a block of memory for the data structure. A data pointer (or multiple data pointers) can point to the memory location where the next data item (the newest item in the buffer) can be stored and it can alternately point to the memory location of the next data item to be retrieved (the oldest item in the buffer). For example, a FIFO buffer can be implemented in memory as a circular buffer of a fixed size where one data pointer points to the memory location where the next data item can be stored and another data pointer points to the memory location where the next data item can be retrieved. A circular buffer is of a finite size, therefore, the data pointers will wrap around as they access all of the memory locations within the data block. Therefore, when a data pointer reaches the end of the buffer address space it wraps around to the starting address of the buffer.

In some implementations, configuration 300 can be implemented in a microcontroller that includes a FIFO buffer and extended instructions for DSP operations. For example, an 8051 based microcontroller can include the extended instructions described in Table I in an MCS-51 based instruction set along with a FIFO buffer to implement DSP extensions in the microcontroller system. The conventional 8051 based microcontroller has no built-in hardware support for FIFO buffer operations. Though the use of hardware based MAC units (e.g., MAC 102, as described with reference to FIG. 1, and MAC 200, as described with reference to FIG. 2A) can speed up the computation of a single MAC operation, most applications may also require that a filter provide a continuous stream of output data samples from a stream of input data samples. With the addition of time, equation [1] becomes the sum of products given by $$Y(t) = \sum_{i=0}^{N} A(i) \cdot X(t-i). \quad (2)$$

In addition to the current value of the input data sample, X, at time, t, the previous N values of the input data samples are also maintained to compute output, Y. At every time step, the oldest sample (X(t–N)) is discarded. Then, X(t) becomes X(t−1), X(t−1) becomes X(t−2), and so on, with the current input data sample becoming X(t). These types of operations can be implemented using a FIFO buffer, where the newest data sample is added to the top (head) of the FIFO buffer, while the oldest data sample is removed from the bottom (tail) of the FIFO buffer.

In some implementations, a FIFO buffer can be created in a microcontroller by allocating a block of memory of size N+1, for example, in the microcontroller's Random Access Memory (RAM), to hold all the required data samples, X. In the case where two data pointers can be used, one data pointer can point to the memory location that contains the FIFO head sample, and the other data pointer can point to the memory location that contains the FIFO tail sample. The data pointers can address the FIFO buffer in a circular fashion. For example, when a data pointer reaches the end of the allocated FIFO buffer address space it wraps around to the starting address of the FIFO buffer.

An implementation using the sum of products in equation [2] in a MAC operation can use a FIFO buffer that is always full where the input data samples enter and leave the FIFO buffer at a constant rate. Therefore, a single data pointer can be used to access the memory locations in the FIFO buffer because the FIFO buffer head and the FIFO buffer tail are located at adjacent memory locations in the FIFO buffer.

Implementing a FIFO buffer data pointer entirely in software on a microcontroller, for example an 8051 based microcontroller, can result in computational overhead that is associated with the address calculations needed to implement the circular addressing. To simplify this process, the FIFO buffer size can be allocated to be 256 bytes or less and the FIFO buffer can be aligned to a 256 byte block of memory (e.g., RAM). This can allow for the use of 8-bit operations on 16-bit data pointers.

Below is an example software routine, written in assembly language code utilizing an MCS-51 based instruction set, which can fetch a data byte from the FIFO buffer and advance the FIFO buffer data pointer using positive (upward) traversal.

```
      ;; positive (upward) traversal
      MOVX A, @DPTR        ; fetch byte
      MOV R0, A            ; save data
      MOV A, DPL           ; get pointer low byte
      CJNE A, FEND, UPD    ; end of buffer?
      MOV DPL, #0          ; overflow to start
      SJMP DONE            ; else
UPD:  INC DPTR             ; advance pointer
DONE: MOV A, R0            ; restore data
```

Below is an example of a software routine, written in assembly language code utilizing an MCS-51 based instruction set, which can fetch a data byte from the FIFO buffer and advance the FIFO buffer data pointer using negative (downward) traversal.

```
      ;; negative (downward) traversal
      MOVX A, @DPTR        ; fetch byte
      MOV R0, A            ; save data
      MOV A, DPL           ; get pointer low byte
      JNZ UPD              ; start of buffer?
      MOV DPL, FEND        ; underflow to end
      SJMP DONE            ; else
UPD:  DEC DPL              ; advance pointer
DONE: MOV A, R0            ; restore data
```

In the examples above, the additional time required to check whether the data pointer address needs to wrap around or not is further compounded by being required once per MAC operation (e.g., N+1 times). Additionally, the microcontroller system (in this example a conventional 8051 microcontroller) handles both the MAC operation and the FIFO buffer operations. Below is an example of a software filter routine for a sum of products algorithm that includes MAC operations and FIFO buffer operations. The software filter routine can provide a continuous stream of output data samples from a stream of input data samples. The routine is written in assembly language code utilizing an MCS-51 based instruction set.

```
FIR:   ;; store new sample to FIFO
       MOV A, DATAL
       MOVX @DPTR, A          ; store low byte
       INC DPTR
       MOV A, DATAH           ; store high byte
       MOVX @DPTR, A
       ACALL FIFO             ; handle FIFO
       ;; setup for MAC
       MOV TAPS, #N           ; number of taps
       CLR A                  ; clear MAC
       MOV MAC0, A
       MOV MAC1, A
       MOV MAC2, A
       MOV MAC3, A
       MOV MAC4, A
       INC AUXR1              ; switch data pointers
       MOV DPTR, #COEFF       ; load pointer to coeff. table
       INC AUXR1              ; switch data pointers
       ;; compute sum of products
LOOP:  MOVX A, @DPTR          ; fetch low data byte
       MOV R0, A              ; save data
       INC DPTR
       MOVX A, @DPTR          ; fetch high data byte
       MOV R1, A
       ACALL FIFO             ; handle FIFO
       INC AUXR1              ; switch data pointers
       CLR A
       MOVC A, @A+DPTR        ; fetch low coeff. byte
       MOV R2, A
       INC DPTR
       MOVC A, @A+DPTR        ; fetch high coeff. byte
       MOV R3, A
       INC DPTR
       INC AUXR1              ; switch data pointers
MAC:   ;; the following would contain the code for performing
       ;; the MAC operation
       .
       .
       DJNZ TAPS, LOOP        ; compute N taps
       INC DPTR
       ACALL FIFO             ; discard last sample
       RET
FIFO:  MOV A, DPL             ; get pointer low byte
       CJNE A, FEND, UPD      ; end of buffer?
       MOV DPL, #0            ; overflow to start
       SJMP DONE              ; else
UPD:   INC DPTR               ; advance pointer
DONE:  RET
```

Referring to the software filter routine above, even if the MAC operation uses zero clock cycles, the main loop of the filter (the loop which fetches the data coefficient and the data sample and then computes their product) requires 32 clock cycles that are repeated N+1 times. On a conventional 8051 based microcontroller, the operands for the MAC operation are stored in SFRs (the coefficient can be stored, as shown in the example above, with the low byte in register, R2 and the high byte in register, R3) requiring an additional 4 clock cycles. Therefore, the main loop requires a total of 36 clock cycles per iteration. Also, the software filter routine handles FIFO buffer addressing to three different memory locations at three different times during the routine: first, when a new data sample is stored in the FIFO buffer; second, when the data samples are retrieved from the FIFO buffer; and third when the oldest data sample in the FIFO buffer is discarded.

The use of special data pointer modes in a microcontroller can speed up the non-computational portions of the sum of products algorithm by decreasing the time it takes to access the data samples and coefficients in memory. In some implementations, these special data pointer modes can be included in an extended MCS-51 based instruction set on an 8051 based microcontroller.

The software filter routine described above requires two data pointers, one to the FIFO buffer that contains the data samples, and another to the FIFO buffer that contains the coefficients. To speed up the handling of the data pointers, multiple data pointers (e.g., two) with fast context switching can be used, as described in co-pending and jointly-owned U.S. patent application Ser. No. 11/687,474, for "Data Pointers With Fast Context Switching."

The use of multiple data pointers can reduce the time to switch between data pointers for the coefficient FIFO buffer and the data sample FIFO buffer. For example, dual data pointers can be implemented in an 8051 based microcontroller with the use of extended instructions to the MCS-51 based instruction set. Use of dual data pointers can be denoted by the /DPTR mnemonic. However, other mnemonics are possible.

Referring to FIG. 3, configuration 300 is for a FIFO address portion of a CPU (e.g., CPU 202). For example, the CPU can be included in an 8051 based microcontroller that includes an extended instruction set. Included in the configuration 300 is the configuration register 302 (DSPR), which can be, for example, an 8-bit register whose bits affect the implementation of the DSP instruction extensions. The various bits of configuration register 302 will now be described.

The window bits 314 (MRW1 and MRW0) of configuration register 302 specify which pair of bytes from the five byte register 207 are accessible through special function register locations 230 and 232, a described in reference to FIG. 2B.

The value of signed multiply operand B bit 316 (SMLB) can determine if the MUL AB instruction treats the contents of register B as signed or unsigned. For example, if bit 316 is equal to logic 0, the contents of register B can be treated as unsigned. If bit 316 is equal to logic 1, the contents of register B can be treated as signed. Similarly, the value of signed multiply operand A bit 318 (SMLA) can determine if the MUL AB instruction treats the contents of the accumulator, A, as signed or unsigned. For example, if bit 318 is equal to logic 0, the contents of the accumulator can be treated as unsigned. If bit 318 is equal to logic 1, the contents of the accumulator can be treated as signed.

The value of DPTR1 finite impulse response (FIR) buffer mode bit 320 (FBE1) can determine how the data pointer register 1 (DPTR1) is updated. The control for updating the data pointer registers can be implemented by a data pointer configuration register, as, for example, described in co-pending and jointly-owned U.S. patent application Ser. No. 11/687,474, for "Data Pointers With Fast Context Switching."

For example, if bit 320 is equal to logic 0, data pointer register 1 can update normally, as determined by the values of the bits of the data pointer configuration register. If bit 320 is equal to logic 1, data pointer register 1 can be updated as determined by the values of the bits of the data pointer configuration register and can also be controlled to address a circular buffer. Decrementing the data pointer register 1 when its value is equal to 0x0000 can underflow to a finite impulse response depth, whose value is included in the FIRD register 308, which will be described in more detail below. Incrementing the data pointer register 1 when its value is equal to the finite impulse response depth can overflow to 0x0000. The data pointer register 1 can update normally for addresses above the FIRD.

In a similar manner, the value of DPTR0 FIR buffer mode bit 322 (FBE0) can determine how the data pointer register 0 (DPTR0) is updated. For example, if bit 322 is equal to logic 0, data pointer register 0 can update normally. If bit 322 is equal to logic 1, data pointer register 0 can be updated as determined by the values of the bits of the data pointer configuration register and can also be controlled to address a circular buffer. Decrementing the data pointer register 0 when its value is equal to 0x0000 can underflow to a finite impulse response depth, whose value is included in the FIRD register 308. Incrementing the data pointer register 0 when its value is equal to the FIRD can overflow to 0x0000. The data pointer register 0 can update normally for addresses above the FIRD.

In some implementations, the value of a MOVC index disable bit 324 (MVCD) can determine if a MOVC A, @A+DPTR instruction can function normally, using indexed addressing. For example, if bit 324 is equal to logic 0, the instruction can function normally. If bit 324 is equal to logic 1, the instruction can function as a MOVC A, @DPTR instruction without indexing.

In some implementations, the value of data pointer redirect to B bit 326 (DPRB) can determine the active source/destination register for MOVC and MOVX instructions that reference data pointer register 1 (DPTR1). For example, if bit 326 is equal to logic 0, the accumulator can be the source/destination register. If bit 326 is equal to logic 1, register B can be the source/destination register.

In some implementations, a finite impulse response buffer can be configured at the bottom of external data memory space. The buffer can be configured in RAM, for example, on an 8051 based microcontroller system. The buffer can be a circular buffer of up to 256 bytes (or 128 words). The buffer can occupy the addresses from 0x0000 to the address specified by the FIRD register 308. As described above, when a data pointer is incremented past the address value in the FIRD register 308, it will overflow to 0x0000 if the corresponding FIR buffer mode for the data pointer register is enabled. For example, if bit 320 (FBE1) is set equal to logic 1 and data pointer register 1 (DPTR1) is incremented past the address value in FIRD register 308, the value of data pointer register 1 will be set to 0x0000. As was also described above, when a data pointer is decremented past 0x0000, it can underflow to the address value in the FIRD register 308 if the corresponding FIR buffer mode for the data pointer register is enabled. For example, if bit 322 (FBE0) is set equal to logic 1 and data pointer register 0 (DPTR0) is decremented past 0x0000, the value of data pointer register 1 will be set to the address value in the FIRD register 308.

In some implementations, a FIFO buffer for use in a software filter routine for a sum of products algorithm can be configured as a circular buffer. The implementation of the FIRD register 308 removes the need for the software to check for the boundaries of the FIFO buffer when addressed. In some implementations, the FIRD register 308 can be configured as an 8-bit wide register. This limits the size of the FIFO buffer that can be implemented using circular addressing to 256 bytes. In alternate implementations, the FIRD register 308 can be configured as a 16-bit register, which would increase the size of the FIFO buffer that can be used. Limiting the FIRD register 308 to an 8-bit register, however, can reduce system costs.

In configuration 300, the lower byte 310 of the data pointer register (DPTR0) is input to comparator 328 along with the value of the FIRD register 308. The values are compared. In this example, if the values are equal, the output 330 of comparator 328 will be set equal to logic 1. If the values are not equal, the output 330 of comparator 328 will be equal to logic 0. The output 330 of comparator 328 is applied to input 332 of AND gate 334. Bit 322 (FBE0) of the configuration register 302 is applied to input 336 of AND gate 334. In this example, if inputs 332 and 336 are equal to logic 1, this indicates that the value of the data pointer register 310 (DPTR0) is equal to the value in the FIRD register 308 and a circular buffer is implemented.

In some implementations, the output 338 of AND gate 334 is input to a select input 338 of switch 304 (e.g., 2:1 digital multiplexer). If the output 338 is logic 1, the switch 304 outputs hexadecimal zero 340 (e.g., hardwired 0x0000), or other desired reset value, to the data pointer register 310, 312, if a register overflow occurred and the data pointer has been rolled back to the FIFO buffer starting address. If input 322 is equal to logic 0 (the value in the data pointer register 310 is not equal to the value in the depth register 308), the output 338 of AND gate 334 is equal to logic 0 and the value of input 336 (bit 322 (FBE0)) is ignored. As the register 310 (DPTR0) is not pointing to the end of the FIFO buffer, it does not matter if circular addressing is enabled, as an addressing overflow has not occurred. The output 338 of AND gate 334 is input to decoder 304, and incremented (e.g., a "1" 342 is added to register 310 (DPTR0)). Also, if input 336 is equal to logic 0 (bit 322 (FBE0) is equal to logic 0 and circular buffer addressing is not enabled), the output 338 of AND gate 334 is also logic 0 and register 310 (DPTR0) is incremented. The input 332 of AND gate 334 can be ignored as circular addressing is not enabled.

In another implementation of configuration 300, the data pointer register can be data pointer register 1 (DPTR1). In this case, bit 320 (FBE1) would be used in place of bit 322 (FBE0) and operations would proceed as described above.

Memory Read Portion of a CPU

Figure 4:
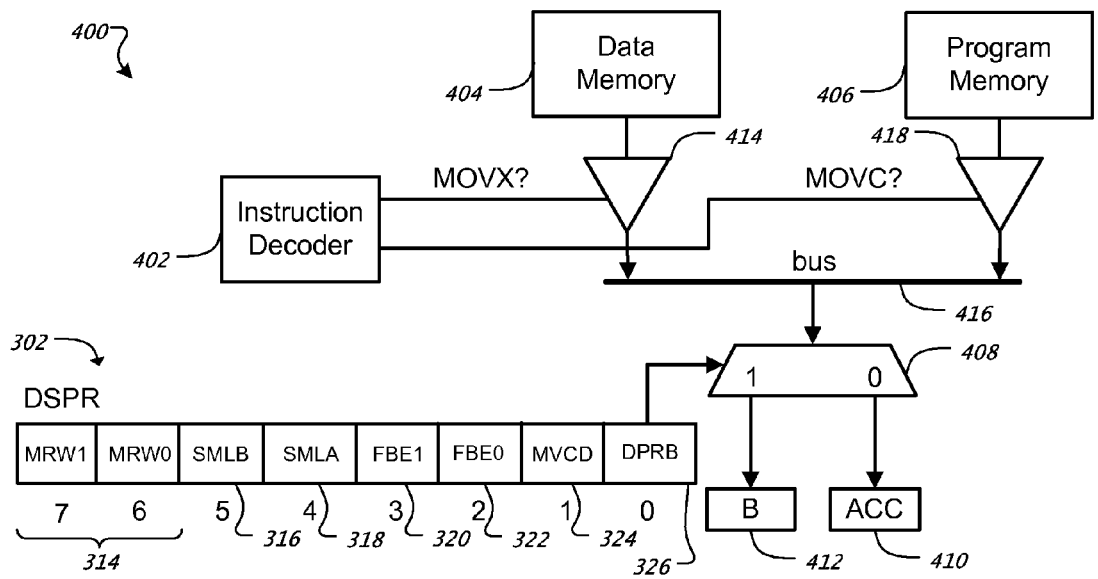
FIG. 4 illustrates an implementation of a configuration for a memory read portion of a CPU for use with an extended instruction set for DSP operations.

FIG. 4 illustrates an implementation of a configuration 400 for a memory read portion of a CPU for use with DSP extensions. The configuration 400 includes instruction decoder 402, data memory 404, program memory 406, switch 408, accumulator 410 (ACC), register 412 (B), and DSP configuration register 302 (DSPR).

Data memory 404 can include input data samples for use in a sum of products algorithm implemented in a digital filter routine, as described in reference to FIG. 3. The input data samples can be located in a FIFO buffer which implements circular addressing. Program memory 406 can include data coefficients for use in a sum of products algorithm implemented in the digital filter routine. In some implementations, data memory 404 can be implemented as RAM and program memory 406 can be implemented as FLASH memory in an 8051 based microcontroller system. RAM can be written to as well as read from randomly on a byte-by-byte basis. FLASH memory, however, can be read from randomly on a byte-by-byte basis but can be written to sequentially, blocks at a time, for example, during a controlled setup operation. Therefore, the data coefficients used for the sum of products algorithm can be included in program memory 406 as they do not need to be updated during MAC operations but can be programmed into the program memory 406 during, for example, a setup operation.

In some implementations, instruction decoder 402 can determine if a MOVX instruction or a MOVC instruction is to be executed. If instruction decoder 402 determines that a MOVX instruction is to be executed, data from the data memory 404 can be enabled by gate 414 onto bus 416. The bus 416 can input the data into the decoder 408. Data pointer redirect to B bit 326 (DPRB) is input to the select input 420 of switch 408 (e.g., a 2:1 digital multiplexer). If bit 326 is equal to logic 0, the accumulator 410 (ACC) can be used as the destination register for the data input to switch 408 from the data memory 404. If bit 326 is equal to logic 1, the register 412 (B) can be used as the destination register for the data input to switch 408 from the data memory 404.

If instruction decoder 402 determines that a MOVC instruction is to be executed, data from the program memory 406 can be enabled by gate 418 onto bus 416. The bus 416 can input the data into the switch 408. Data pointer redirect to B bit 326 (DPRB) is input to the select input 420 of switch 408. If bit 326 is equal to logic 0, the accumulator 410 (ACC) can be used as the destination register for the data input to switch 408 from the program memory 406. If bit 326 is equal to logic 1, the register 412 (B) can be used as the destination register for the data input to switch 408 from the program memory 406.

Indexed Address Portion of a CPU

Figure 5:
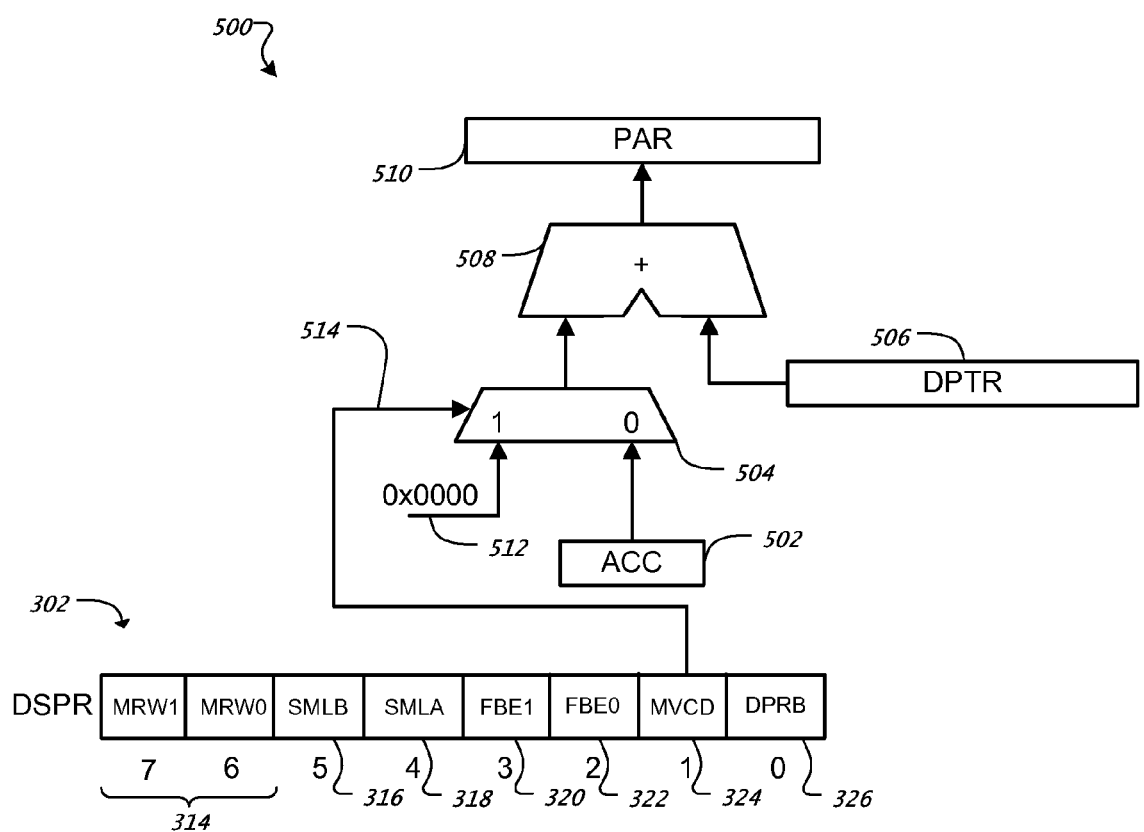
FIG. 5 illustrates an implementation of a configuration for an indexed address portion of a CPU for use with an extended instruction set for DSP operations.

FIG. 5 illustrates an implementation of a configuration 500 for an indexed address portion of a CPU for use with DSP extensions. The configuration 500 includes DSP configuration register 302 (DSPR), accumulator 502 (ACC), switch 504, data pointer register 506 (DPTR), adder/accumulator (ADD) 508, and program address register 510 (PAR).

In some implementations, the configuration 500 can be used to determine if indexed addressing is to be used when a MOVC A, @A+DPTR instruction, to move data out of program memory and into the accumulator 502, is executed. The value in accumulator 502 and hexadecimal zero 512 (0x0000) are input into the switch 504 (e.g., 2:1 digital multiplexer). The MOVC index disable bit 324 (MVCD) is input to the select input 514 of switch 504. If bit 324 is equal to logic 0, a MOVC A, @A+DPTR instruction will function normally, using indexed addressing. The value in the accumulator 502 can be selected to be the output of switch 504. The output of switch 504 can then be input to adder 508. The data pointer register 506 can also be input to adder 508. Adder 508 combines the value in the accumulator 502 with the value of the data pointer register 506 to determine the value of program address register 510. Adder 508 inputs this value into the program address register 510. The program address register 510 then contains the address of the memory location in program memory to be accessed. The value contained in this memory location can then be loaded into the accumulator 502 and instruction execution is complete.

If bit 324 is equal to logic 1, a MOVC A, @A+DPTR instruction will function as a MOVC A, @DPTR, and indexed addressing will not be used. The value hexadecimal zero 512 can be selected to be the output of switch 504. The output of switch 504 can then be input to adder 508. The data pointer register 506 can also be input to adder 508. Adder 508 combines the value in the accumulator 502 with the value of the data pointer register 506 to determine the value of program address register 510. In this case, this value is equal to the value of the data pointer register 506. Adder 508 inputs this value into the program address register 510. The program address register 510 then contains the address of the memory location in program memory to be accessed. The value contained in this memory location can then be loaded into the accumulator 502 and instruction execution is complete.

In some implementations, a microcontroller system can include specialized hardware and extended instructions to an instruction set to optimize a MAC operation. Many of these implementations have been described with reference to FIGS. 1-5. A microcontroller system can be implemented with many of the described implementations on an 8051 based microcontroller using an extended MCS-51 based instruction set. Tradeoffs between system execution times and cost can be considered in the design.

In some implementations, an 8051 based microcontroller system can include special data pointer modes, for example, data pointers with fast context switching. These modes are disclosed in co-pending and jointly-owned U.S. patent application Ser. No. 11/687,474, for "Data Pointers With Fast Context Switching." Use of a /DPTR mnemonic can reduce the switching time between data pointers. Also, by enabling the setting of bits in a data pointer configuration register (DPCF) any MOVX or MOVC instruction that uses a data pointer for indirect addressing (e.g., MOVX A, @DPTR, MOVC A, @DPTR) can also automatically update the data pointer value. Other bits in the data pointer configuration register can control whether the update to the data pointer value is a post-increment or a post-decrement. The automatic update feature of the data pointer can also be used in addressing a FIFO buffer.

In some implementations, the microcontroller may include a limited amount of RAM. Therefore, the storage of the data coefficients in program memory, as described in reference to FIG. 4, can reduce the amount of RAM that may be required in the microcontroller system. A bottleneck can be created when data samples are stored in RAM and data coefficients are stored in program memory as both instructions to access each type of memory, MOVX and MOVC, use the accumulator as both an operand for indexed addressing and as the destination (e.g., MOVX A, A+@DPTR and MOVX A, A+@DPTR). To alleviate this bottleneck, two additional data pointer modes can be used, as described in reference to FIG. 4. A data pointer redirect to B bit 326 of the DSP processing configuration register 302 can switch between the two modes, controlling whether register B 412 or the accumulator 410 can be used as a destination register.

The MOVC instruction can be configured to use basic indirect address or indexed indirect addressing, as was described in reference to FIG. 5. The MOVC index disable bit 324 controls this operation. Selecting the basic indirect addressing mode can free the software from either having to repeatedly zero the index or maintain the index in another register.

A software filter routine for a sum of products algorithm that includes MAC operations and FIFO buffer operations utilizing the configurations described in reference to FIGS. 2A, 2B, 3, 4, and 5 is shown below. In the example shown, the digital filter routine provides a continuous stream of output data samples from a stream of input data samples. The routine is written in assembly language code utilizing an MCS-51 based instruction set.

```
INIT:   ;; initialize configuration registers
        ;; initialize the data pointer configuration register (DPCF) to use
        ;; dual data pointers with fast context switching
        MOV DPCF, #DUAL_DPTRS
        ;; initialize the digital signal processing configuration register
        ;; (DSPR) for circular FIFO addressing for the data sample
        ;; FIFO buffer and the data coefficient FIFO buffer
        MOV DSPR, #CIRC_ADD
        ;; set the finite impulse response depth register (FIRD) equal to
        ;; the number of taps plus one (N+1)
        MOV FIRD, #(N+1)
        ;; set the bits in the data pointer configuration register (DPCF)
        ;; to use automatic updating of the data pointers
        MOV DPCF, #AUTO_UPDATE
        ;; load the starting address of the data sample FIFO buffer into
        ;; the data sample FIFO buffer pointer
        MOV DPTR, #SAMPLE
        ;; load the starting address of the data coefficient FIFO buffer
        ;; inot the data coefficient FIFO buffer pointer
        MOV /DPTR, #COEFF
FIR:    ;; store new sample to
        FIFO
        MOV A, DATAH
        MOVX @DPTR, A       ; store high byte, dptr0++
        MOV A, DATAL
        MOVX @DPTR, A       ; store low byte, dptr0++
        ACALL FIFO          ; handle FIFO
        ; ; setup for MAC
        MOV R7, #N          ; number of taps
        CLR M               ; clear MAC M register
        MOV /DPTR, #COEFF   ; load pointer to the coefficient table
LOOP:   MOVX A, @DPTR       ; fetch high data byte, dptr0++
        MOV AX, A           ; save high data byte to the extended
                            ; accumulator
        MOVX A, @DPTR       ; fetch low data byte, dptr0++
        MOVX B, @/DPTR      ; fetch high coefficient data byte,
                            ; dptr1++
        MOV BX, B           ; save high coefficient data byte
                            ; to the extended B
                            ; register
        MOVX B, @/DPTR      ; fetch low coefficient data byte,
                            ; dptr1++
        MAC AB              ; perform the multiply
        DJNZ R7, LOOP       ; compute N taps
        INC DPTR
        INC DPTR            ; discard the tail of the FIFO
DONE:   RET
```

Previously described were examples of assembly language code that can be used as a software filter routine for a sum of products algorithm that includes MAC operations and FIFO buffer operations. Table II below is a performance comparison for the filter routines that shows the number of bytes, and the number of microcontroller clock cycles that are used to implement a finite impulse response routine where the number of taps, N, is equal to 16.

TABLE II

Performance Comparison

| FIR routine where N = 16 | Bytes | Cycles |
|---|---|---|
| No DSP Support | 162 | 2279 |
| MAC Coprocessor | 63 | 831 |
| MAC unit in CPU | 31 | 472 |

Sums-of-Products Algorithm

Figure 6:
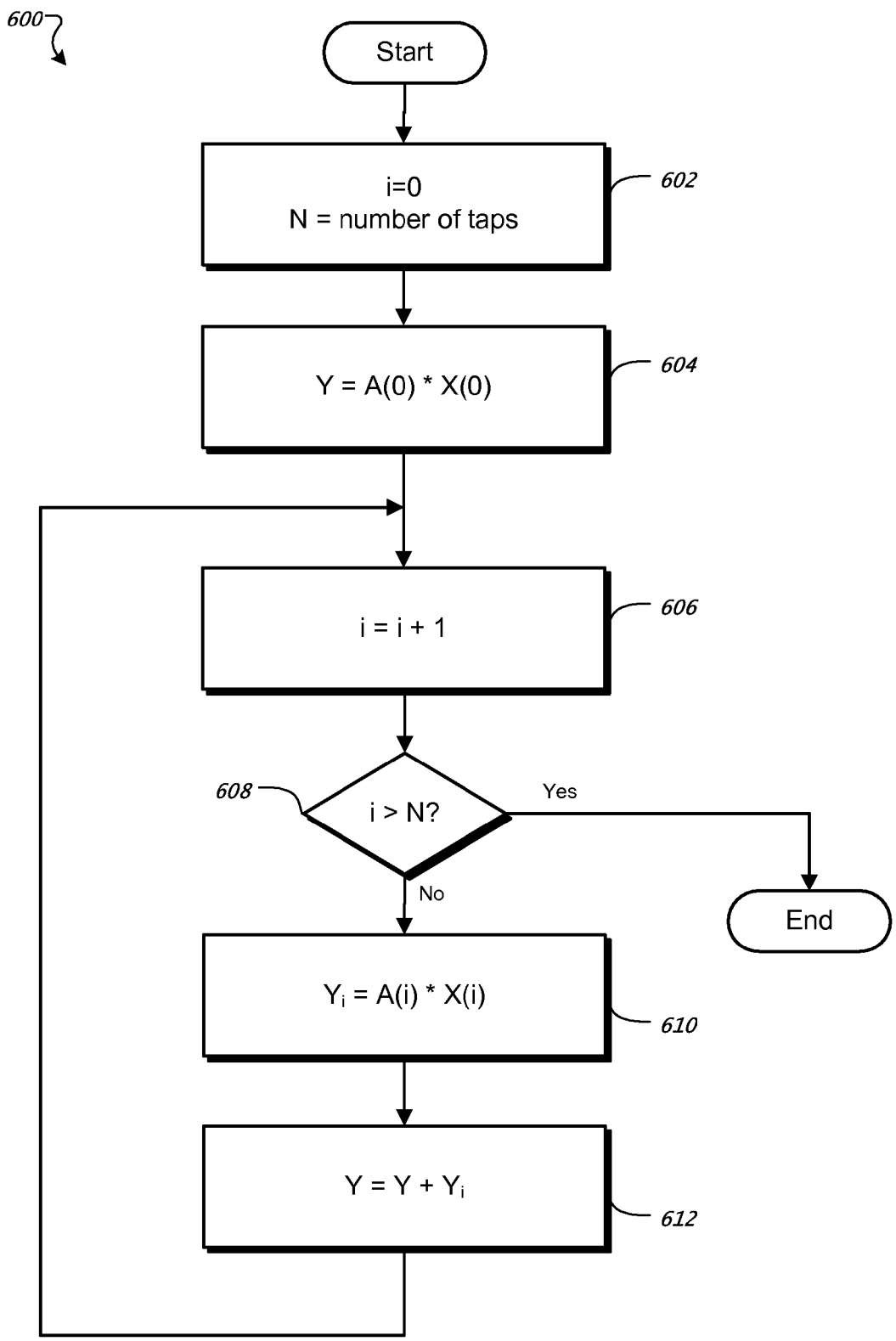
FIG. 6 is a flow diagram of an implementation of a method for a sum of products algorithm.

FIG. 6 is a flow diagram of an implementation of a method 600 for a sum of products algorithm. The method 600 is an implementation of the sum of products in equation [1].

The method 600 begins by setting the index, i, equal to zero and N equal to the number of taps for the sum of products algorithm (602). Using the index value of "0", the data sample, X(0) is retrieved and the data coefficient, A(0) is retrieved and the values are multiplied together to form the result, Y (604). The index, i, is incremented (606). If the index, i, is greater than N, the number of taps (608), then the method 600 ends. If the index, i, is less than or equal to N, the number of taps (608), the data sample, X(i) is retrieved and the data coefficient, A(i) is retrieved and the values are multiplied together, resulting in the result, $Y_i$ (610). $Y_i$ is added to the running total, Y (612). The method 600 continues to step 606.

Sums-of-Products Algorithm in Software on a Microcontroller

Figure 7A:
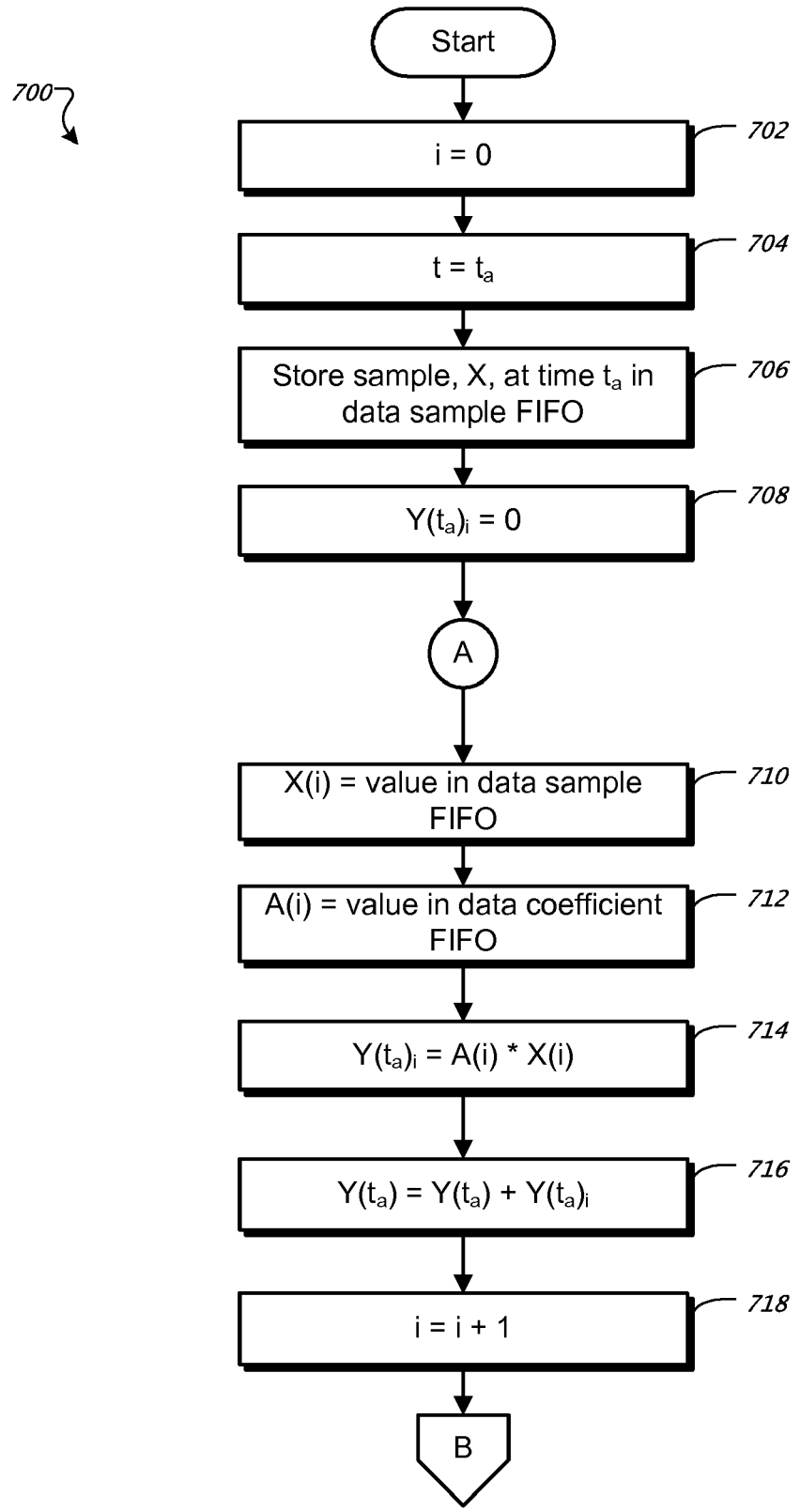
FIGS. 7A and 7B are flow diagrams of an implementation of a method for a sum of products algorithm that can be implemented in software on a microcontroller.
Figure 7B:
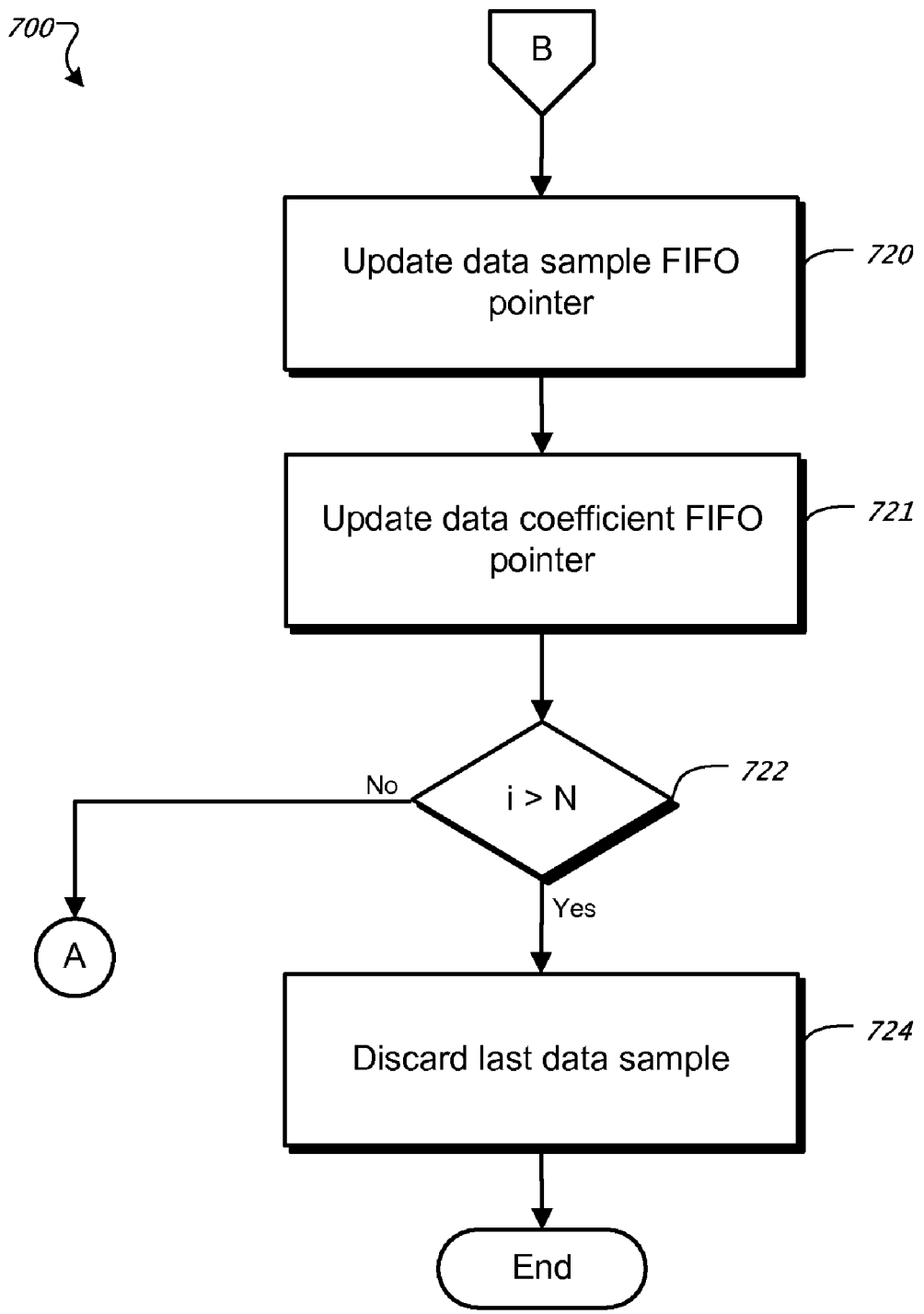

FIGS. 7A and 7B are flow diagrams of an implementation of a method 700 for a sum of products algorithm that can be implemented in software on a microcontroller. For example, the method 700 can be implemented on an 8051 based microcontroller utilizing am MCS-51 based instruction set. The method 700 can also include the use of a FIFO buffer for storing the input data samples. The method 700 is an implementation of the sum of products algorithm in equation [2].

The method 700 begins by setting the index, i, equal to zero (702). Next, time, t, is set equal to the current point in time, $t_a$ (704). The data sample, X, received at time, $t_a$, is stored in the data sample FIFO buffer location pointed to by the data sample FIFO buffer data pointer (706). The sum of products result for this point in time, $t_a$, $Y(t_a)$, is initialized equal to logic 0 (708). The value of a data sample pointed to by the data sample FIFO buffer pointer is loaded into X(i) (710). The value of a data coefficient pointed to by the data coefficient FIFO buffer pointer is loaded into A(i) (712). The data sample, X(i), and the coefficient, A(i) are multiplied together and result, $Y(t_a)i$, for index, i, is generated (714). Next, $Y(t_a)i$ is added to the sum of products result, $Y(t_a)$, to update the sum of products (716). The index, i, is then incremented (718). The data sample FIFO buffer pointer is updated to point to the next location in the FIFO buffer that contains the data sample for the index value, i (720). Similarly, data coefficient FIFO buffer pointer is updated to point to the next location in the FIFO buffer that contains the data coefficient for the index value, i (721)

If the index, i, is less than or equal to N, the number of taps (722), the method 700 continues to step 710. If the index, i, is greater than N, the number of taps (722), next (724), the last data sample (the tail of the data sample FIFO buffer) is discarded and the method ends.

Data Pointers with Fast Context Switching and DSP Extensions

Figure 8A:
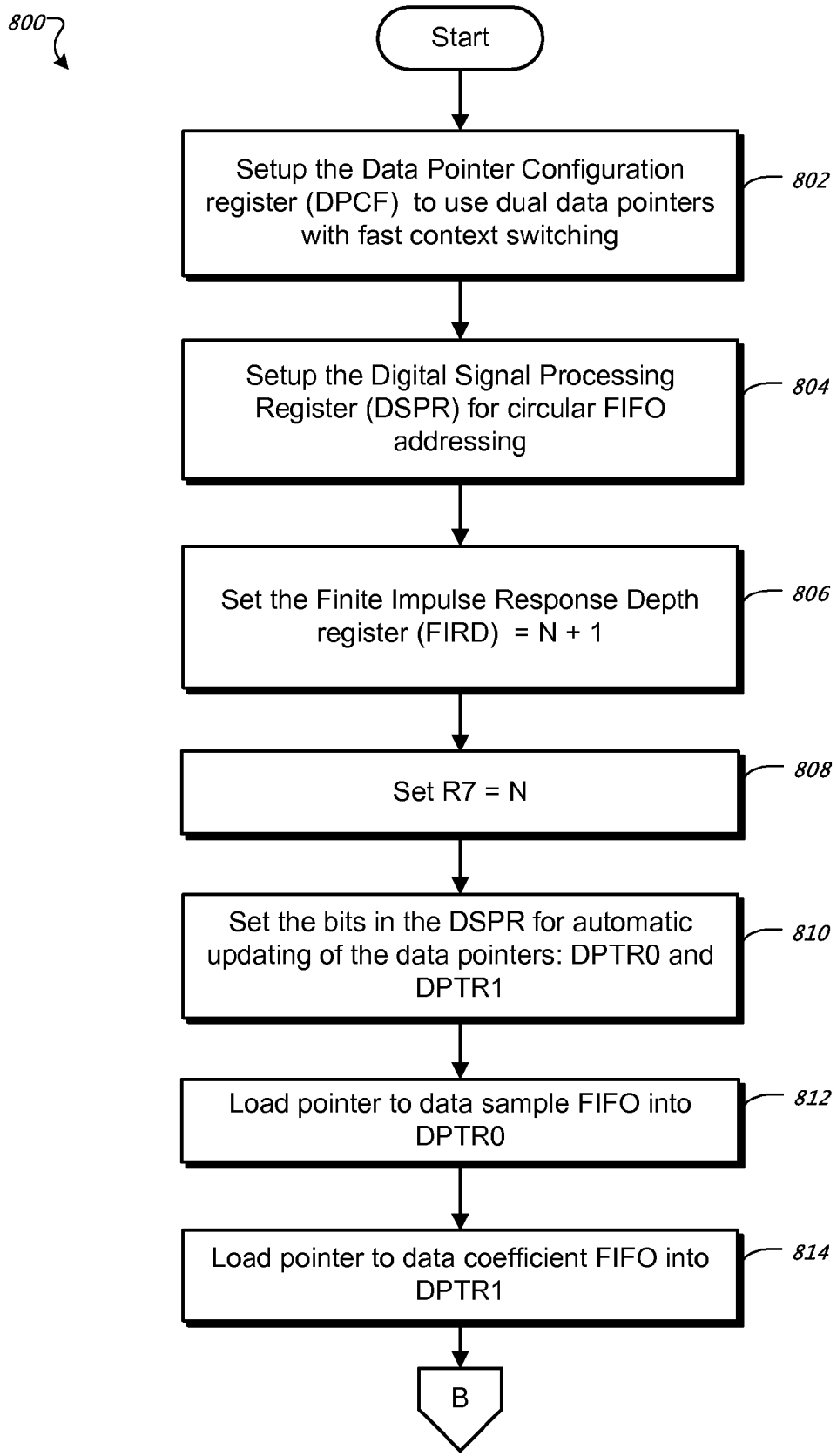
FIGS. 8A and 8B are flow diagrams of an implementation of a method for a sum of products algorithm on a microcontroller that includes data pointers with fast context switching which are responsive to an extended instruction set for DSP operations.
Figure 8B:
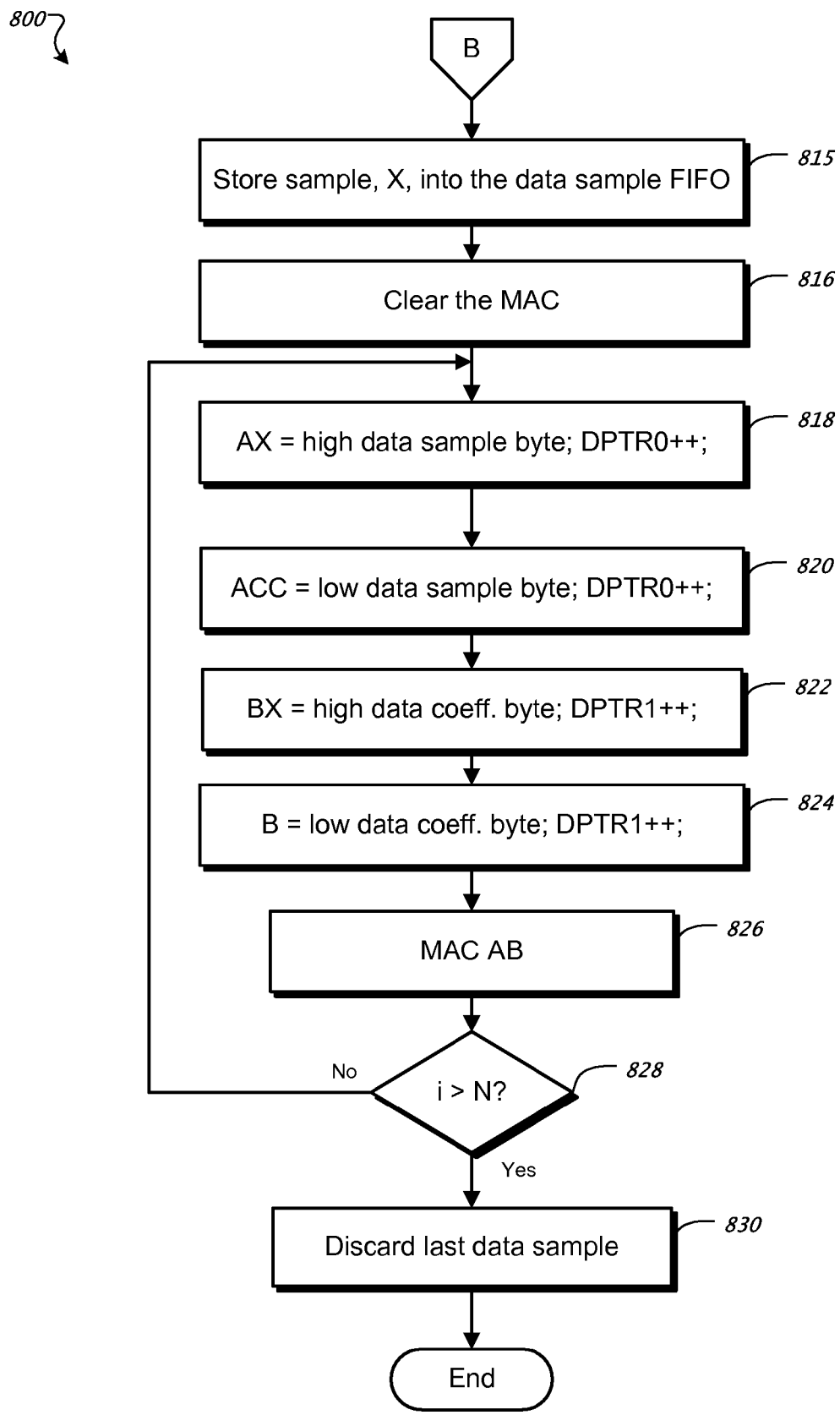

FIGS. 8A and 8B are flow diagrams of an implementation of a method 800 for a sum of products algorithm on a microcontroller that includes data pointers with fast context switching and DSP extensions. The method 800 is an implementation of a digital filter routine for a sum of products algorithm that includes MAC operations and FIFO buffer operations utilizing the configurations described with reference to FIGS. 2A, 2B, 3, 4, and 5. In the example shown, the digital filter routine provides a continuous stream of output data samples from a stream of input data samples. In this example, the routine is written in assembly language code utilizing an MCS-51 based instruction set.

The method 800 begins by initializing the data pointer configuration register to use data pointers with fast context switching, (e.g., MOV DPCF, #DUAL_DPTRS). The details of how this is done can be found in co-pending and jointly-owned U.S. patent application Ser. No. 11/687,474, for "Data Pointers With Fast Context Switching." Next, the DSP configuration register (DSPR) is initialized to include circular addressing for a data sample FIFO buffer in data memory and a data coefficient FIFO buffer in program memory (804), as was described in reference to FIGS. 3-4 (e.g., MOV DSPR, #CIRC_ADD). The FIRD register is set equal to N+1, where N is the number of taps of the sum of products algorithm (806) (e.g., MOV FIRD, #(N1)). A register (e.g., R7) is set to the number of taps, N (808) (e.g., MOV R7, #N). The DSP configuration register (DSPR) is initialized to include automatic updating of the dual data pointers: data pointer register 0 (DPTR0) and data pointer register 1 (DPTR1) (810), as described in reference to FIG. 3 (e.g., MOV DPCF, #AUTO_UPDATE). The data sample FIFO buffer pointer is loaded into data pointer register, DPTR (812) (e.g., MOV DPTR, #SAMPLE). The data coefficient FIFO buffer pointer is loaded into data pointer register /DPTR (814) (e.g., MOV /DPTR, #COEFF). The new data sample is stored in the data sample FIFO buffer (815) (e.g., MOV A, DATAH, MOVX @DPTR, A, MOV A, DATAL, MOVX @DPTR, A). The accumulator registers (e.g., register 207) are cleared (set equal to "0") (816) (e.g., CLR M).

The high data sample byte is fetched from the data sample FIFO buffer and put into the extended accumulator (AX) (820) (e.g., MOVX A, @DPTR, MOV AX, A). The data sample FIFO buffer pointer is incremented. The low data sample byte is then fetched (822) from the data sample FIFO buffer and put into the accumulator (ACC) (e.g., MOVX A, @DPTR). The data sample FIFO buffer pointer is again incremented.

The high data coefficient byte is fetched from the data coefficient FIFO buffer and put into the extended register B (BX) (824) (e.g., MOVC B, @/DPTR, MOV BX, B). The data coefficient FIFO buffer pointer is incremented. The low data coefficient byte is then fetched (826) from the data coefficient FIFO buffer and put into register B, (B) (e.g., MOVC B, @/DPTR). The data coefficient FIFO buffer pointer is again incremented.

The MAC operation is performed (e.g., MAC AB). The count of the number of taps is decremented (830) and, if the count of the number of taps is not equal to "0" (832), the method continues to step 820 (e.g. DJNZ R7, LOOP). However, if the count of the number of taps (832), is equal to "0", the last sample is discarded (834) (e.g., INC DPTR, INC DPTR) and the method 800 ends.

Microcontroller System Including DSP Processing Extensions

Figure 9:
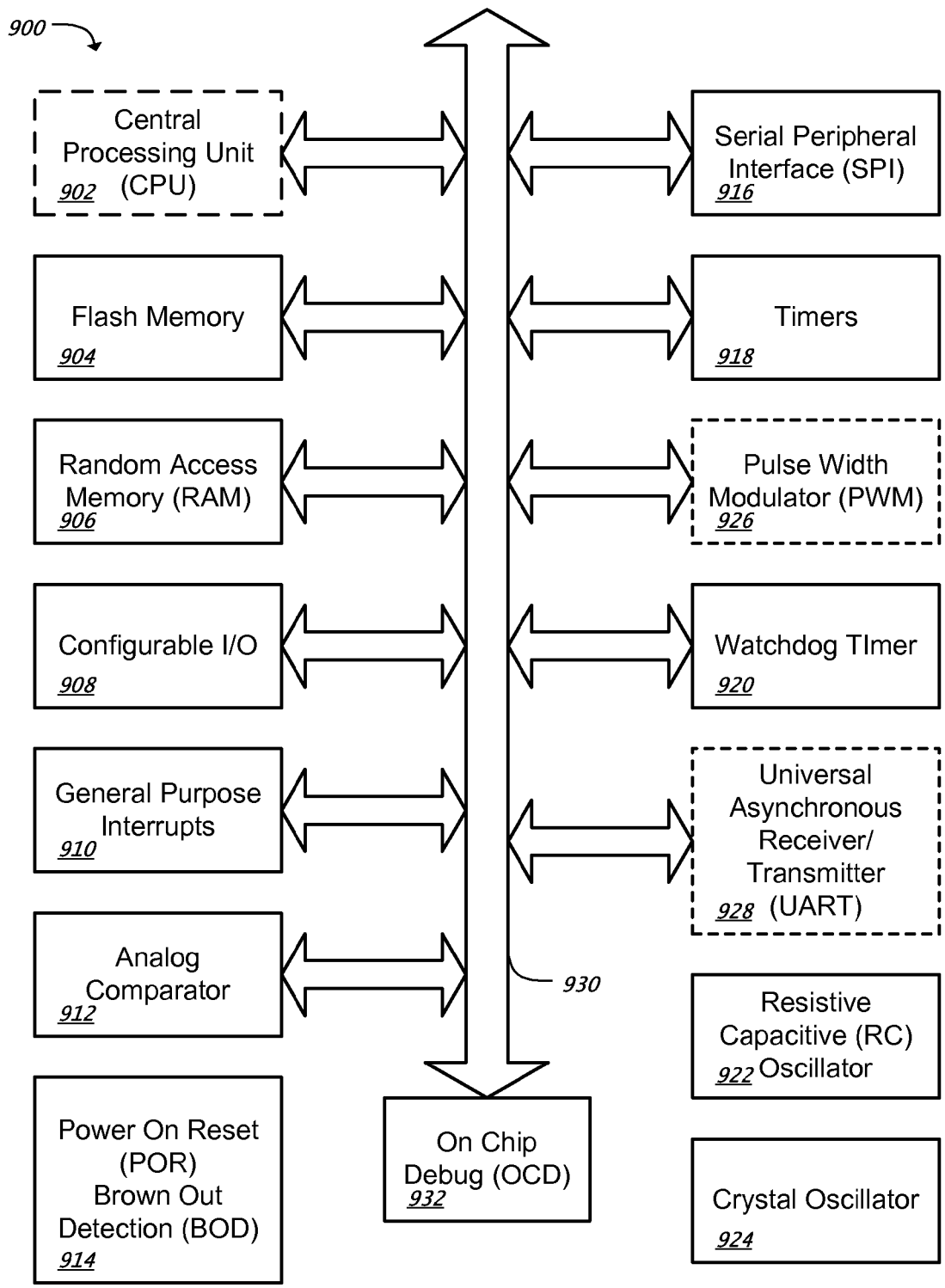
FIG. 9 is a block diagram showing an example microcontroller system, including a CPU that implements data pointers with fast context switching.

FIG. 9 is a block diagram showing an example microcontroller system 900 including a CPU 902 that implements data pointers with fast context switching and DSP extensions. The system 900 also includes flash memory 904, random access memory (RAM) 906, configurable Input/Output (I/O) 908, general purpose interrupts 910, analog comparator 912, power on reset (POR) brown out detection (BOD) 914, serial peripheral interface (SPI) 916, timers 918, watchdog timer 920, resistive capacitive (RC) oscillator 922, crystal oscillator 924, and on chip debug 932. The system can also optionally include pulse width modulator (PWM) 926, and universal asynchronous receiver/transmitter (UART) 928.

The system 900 also includes bus 930. Each of the components of system 900 interface to bus 930. The bus 930 can allow the components of the microcontroller system 900 to communicate with one another, allowing information and data to be passed among the components. The bus 930, for example, can move the outputs of the data memory 404 or the program memory 406 to decoder 416, as shown with reference to FIG. 4.

In some implementations, the microcontroller of FIG. 9 can be a single-cycle 8051 based microcontroller. The 8051 based microcontroller can be programmed using an MCS-51 based extended instruction set, as was previously described.

The CPU 902 can include the circuitry necessary to interpret and execute program instructions, as well as interpret data, for the system 900. The CPU 902 can include the configurations 100, 200, 300, and 900 as described with reference to FIGS. 1, 2, 3, and 5.

The flash memory 904 is a form of non-volatile computer memory that can be electrically erased and reprogrammed in large blocks. The flash memory 904 can contain the program code used by the CPU 902 to control the system 900. In some implementations, flash memory can include 2 K bytes of non-volatile, solid-state storage for use by the system 900. In other implementations, flash memory can include 4K bytes of non-volatile, solid-state storage for use by the system 900. For example, flash memory 904 can include the data coefficient FIFO buffer as described with reference to FIG. 3.

The RAM 906 is a form of volatile computer memory that can be accessed randomly. The RAM 906 can be written to and read from, for example, one byte at a time. It can be used by the system 900 as a working area for loading and manipulating applications and data used by the CPU 902 as well as other components of the system 900. In some implementations, RAM 904 can include 128 bytes of volatile memory. For example RAM 904 can include the data sample FIFO buffer as described with reference to FIG. 3.

In some implementations, configurable I/O 908 are interfaces that the system 900 can use to communicate with other systems outside of the microcontroller system 900. The interfaces can include information processing as well as signal information to be sent by the interfaces. Inputs are signals received by the system 900 and outputs signals are sent from the system 900. Each interface can be referred to as a "port". In some implementations, each port can be individually configured to be either an input or an output port. In some implementations, a port can be configured to be an input-only port, a full complementary metal-oxide-semiconductor (CMOS) output port, an open-drain output port, or a quasi-bidirectional (both input and output) port.

Interrupts can be hardware generated asynchronous signals indicating the need for attention. Interrupts can also be software generated synchronous signals indicating a need for attention to initiate a change in program execution. General purpose interrupts 910 can be configured to perform either hardware or software interrupts.

Various modifications may be made to the disclosed implementations and still be within the scope of the following claims.

What is claimed is:

1. A device, comprising:
    means for receiving an arithmetic instruction;
    means for determining that the arithmetic instruction is a single Multiply-Accumulate (MAC) instruction, including detecting an appended code in the arithmetic instruction, the appended code operable to alter a function performed by the arithmetic instruction, wherein the appended code is a prefix to the arithmetic instruction and not part of the original arithmetic instruction;
    a first register operable for storing a first operand associated with the MAC instruction;
    a second register operable for storing a second operand associated with the MAC instruction;
    means for multiplying the first and second operands to form a current product; and
    means for adding the current product to one or more stored products previously generated by the multiplying means in accordance with the MAC instruction;
    wherein the first and second registers are 16-bit registers, each formed by combining two 8-bit registers of an 8051 architecture, wherein:
    the first register is formed by extending an accumulator of the 8051 architecture with an 8-bit register; and
    the second register is formed by extending a B register for the 8051 architecture with another 8-bit register.

2. A method of performing Multiply-Accumulate (MAC) operations in a device, comprising:
    receiving an arithmetic instruction;
    determining that the arithmetic instruction is a single MAC instruction, including detecting an appended code in the arithmetic instruction, the appended code operable to alter a function performed by the arithmetic instruction, wherein the appended code is a prefix to the arithmetic instruction and not part of the original arithmetic instruction;
    storing a first operand associated with the MAC instruction in a first register;
    storing a second operand associated with the MAC instruction in a second register
    multiplying the first and second operands to form a current product using a multiplier coupled to the first and second registers; and
    adding the current product to one or more stored products previously generated by the multiplier in accordance with the MAC instruction in an adder coupled to the multiplier,
    wherein the first and second registers are 16-bit registers, each formed by combining two 8-bit registers of an 8051 architecture, wherein:
    the first register is formed by extending an accumulator of the 8051 architecture with an 8-bit register; and
    the second register is formed by extending a B register of the 8051 architecture with another 8-bit register.

3. The method of claim 2, wherein
    multiplying the first and second operands includes producing four partial results using a combination of inputs from the accumulator and the first register with the B register and the second register, the four partial results successively added to the adder.

4. The method of claim 2, further comprising:
    storing data pointers for accessing data used in the MAC operations in a number of data pointer registers.

5. The method of claim 4, further comprising:
    automatically updating the data pointers during the MAC operations.

6. The method of claim 2, wherein the appended code is an escape code.

7. The method of claim 6, wherein the device is an 8-bit controller responsive to an MCS-51 instruction set, and the arithmetic instruction is a Multiply (MUL) instruction of the MCS-51 instruction set.

8. The method of claim 7, wherein the MCS-51 instruction set is extended to include instructions for manipulating contents of an accumulator register in the device.

9. The method of claim 6, wherein the escape code is A5 hexadecimal.

10. A device comprising:
    memory operable for storing an arithmetic instruction;
    a processor coupled to the memory including:

an instruction decoder coupled to the memory and operable for:

receiving the arithmetic instruction; and determining that the arithmetic instruction is a single Multiply-Accumulate (MAC) instruction, including detecting an appended code in the arithmetic instruction, the appended code operable to alter a function performed by the arithmetic instruction, wherein the appended code is a prefix to the arithmetic instruction and not part of the original arithmetic instruction;

a first register operable for storing a first operand associated with the MAC instruction;

a second register operable for storing a second operand associated with the MAC instruction;

a multiplier coupled to the first and second registers, the multiplier operable for multiplying the first and second operands to form a current product; and an adder coupled to the multiplier and operable for adding the current product to one or more stored products previously generated by the multiplier in accordance with the MAC instruction;

wherein the first and second registers are 16-bit registers, each formed by combining two 8-bit registers of an 8051 architecture, wherein:

the first register is formed by extending an accumulator of the 8051 architecture with an 8-bit register; and the second register is formed by extending a B register of the 8051 architecture with another 8-bit register.

11. The device of claim 10, wherein the multiplier is an 8×8 hardware multiplier of the 8051 architecture.

12. The device of claim 10, further comprising:

a number of data pointer registers operable for storing data pointers for accessing data memory to retrieve data for use by the MAC instruction.

13. The device of claim 12, further comprising:

address circuitry operable for addressing a buffer for storing data samples using the data pointers.

14. The device of claim 13, wherein the address circuitry further comprises:

a third register operable for storing a data pointer for accessing a data from memory;

a fourth register operable for storing a value indicating a finite impulse response depth;

a comparator coupled to the third and fourth registers and operable for comparing contents of the third and fourth registers and providing a first signal in response to the comparing;

at least one logic device coupled to an output of the comparator and operable to receive the first signal and a second signal indicating a buffer mode, the at least one logic device operable for providing a third signal for initiating a circular buffer mode; and a switch having inputs coupled to a reset value and the third register and having an input select coupled to the third signal, the switch operable to either reset contents of the third register with the reset value or increment the contents of the third register by a predetermined amount in response to the third signal.

15. The device of claim 10, further comprising:

memory read circuitry operable for transferring data from data memory and program memory to a number of destination registers.

16. The device of claim 15, wherein the memory read circuitry further comprises:

a first destination register operable for storing first data from a data memory read;

a second destination register operable for storing second data from a program memory read; and a switch coupled to receive the first and second data from the data memory and program memory, respectively, and operable for providing the first or the second data to the first or second destination register, respectively, in response to a signal.

17. The device of claim 10, further comprising:

indexed address circuitry operable for generating an index for addressing memory.

18. The device of claim 17, wherein the indexed address circuitry farther comprises:

a data pointer register operable for storing a data pointer; and a program address register operable for storing an address of a memory location in program memory to be accessed.

* * * * *

UNITED STATES PATENT AND TRADEMARK OFFICE
CERTIFICATE OF CORRECTION

PATENT NO. : 7,797,516 B2
APPLICATION NO. : 11/687264
DATED : September 14, 2010
INVENTOR(S) : Benjamin Francis Froemming et al.

It is certified that error appears in the above-identified patent and that said Letters Patent is hereby corrected as shown below:

Column 15, Line 42 after "(721)" insert --.--

Column 16, Line 9 delete "#(N1))." and insert --#(N+1)).--

Column 17, Line 3 after "Fig.4" insert --.--

Column 18, Line 26 in Claim 2, after "register" insert --;--

Column 20, Line 37 in Claim 18, delete "farther" and insert --further--

Signed and Sealed this
Eighth Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,797,516 B2 | Page 1 of 1 |
| APPLICATION NO. | : 11/687264 | |
| DATED | : September 14, 2010 | |
| INVENTOR(S) | : Benjamin Francis Froemming et al. | |

It is certified that error appears in the above-identified patent and that said Letters Patent is hereby corrected as shown below:

Page 2, Column 1, line 4, (Other Publications) delete "PCt/US2007/075656" and insert
-- PCT/US2007/075646 --

Signed and Sealed this
Twenty-ninth Day of March, 2011

David J. Kappos
*Director of the United States Patent and Trademark Office*